Dec. 22, 1931.   E. CONTI   1,837,950
METHOD AND APPARATUS FOR ABSORBING SHOCKS
Filed Nov. 21, 1929
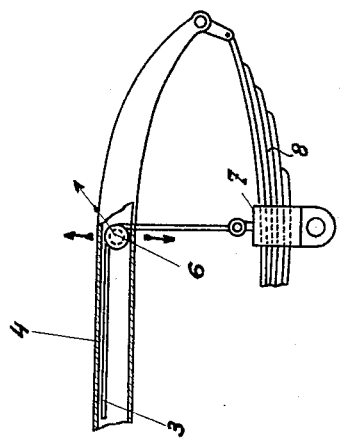
Fig.1
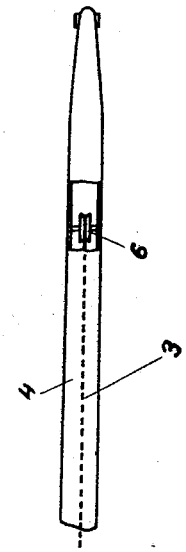
Fig.2
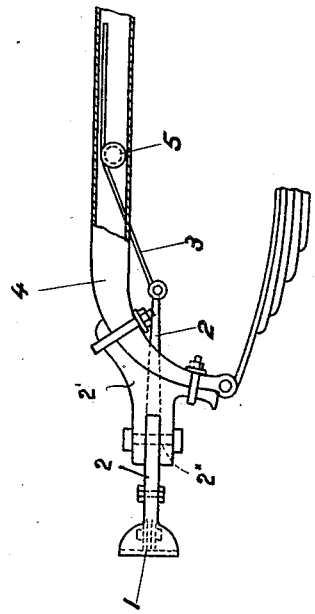
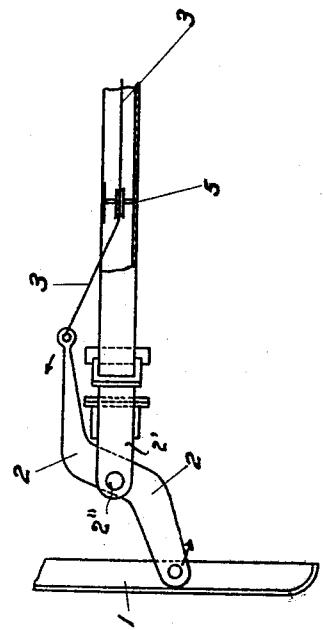
Inventor
Emile Conti
Fred T. Darbon
Attorney.

Patented Dec. 22, 1931

1,837,950

UNITED STATES PATENT OFFICE

EMILE CONTI, OF ALFORTVILLE, FRANCE

METHOD AND APPARATUS FOR ABSORBING SHOCKS

Application filed November 21, 1929, Serial No. 408,934, and in France November 28, 1928.

This invention relates to bumpers and like shock-absorbing devices for vehicles of the type wherein the bumper bar proper is carried upon the free arms of two-armed pivoted levers which are themselves mounted upon the front of the vehicle, whilst the other arms of the two-armed levers are connected to shock-absorbing springs or other devices carried by the vehicle, in such a manner that the movements of the levers are transmitted to the shock-absorbing devices.

Bumpers of the above type have previously been proposed wherein the two-armed levers have been pivotally carried by brackets mounted upon the front dumb irons of the vehicle and in which the arms of the levers remote from the bumper bar have been connected by cables passing over pulleys to shock-absorbing devices carried by the vehicle consisting of springs which are adapted to be put into compression by the movement of the levers. Further it has been proposed to provide shock neutralizers for vehicles, especially for the front part of vehicles, for neutralizing shocks caused by the front wheels passing over ruts or ridges and to utilize the elastic elements in such shock neutralizers to also neutralize shocks caused by collision, the arrangement of comprising one or more flexible shock neutralizing elements, for example coiled springs housed in casings attached to the vehicle frame, connected with the vehicle springs and connected also with a bumper, the operation of the arrangement being such that either the vehicle springs or the bumper or both may render said neutralizing elements operative to neutralize shocks imparted to the vehicle.

It is well known that when a shock is given to an oscillating system, that is, a system which possesses an inertia and a resiliency, it gives birth to a series of oscillations which damp out more or less rapidly according to the value of the damping factor of the system. The energy of the initial shock is thus progressively absorbed during damping of the oscillations.

According to the present invention bumpers and the like shock-absorbing devices for vehicles of the type set forth are characterized by the fact that the ends of the two-armed pivoted levers remote from the bumper bar are connected to the rear springs of the vehicle, the connection being such that energy effects exerted on the bumper bar are transmitted to the rear springs and to the whole of the vehicle.

With such an arrangement, when the vehicle meets an obstruction, the bumper bar, hicle meets an obstruction, the bumper bar, operating through the pivoted levers and the connecting means, sets into oscillation the resilient system constituted by the rear springs of the vehicle, such oscillations exerting themselves on the whole of the vehicle and thus allowing all the resilient parts thereof to participate in the damping of the oscillations.

The oscillations continue until complete damping out, that is, until all the resilient parts of the vehicle have returned to a state of rest.

It will thus be seen that with this device, all oscillation in one direction and chiefly the first due directly to the shock is immediately largely compensated by an oscillation in the reverse direction. All points of the vehicle and all that is transported thereby and particularly the occupants are subjected to a series of forces in opposite directions substantially equal and acting in a space of time sufficiently short that their resultant effect is practically nothing.

A preferred method of carrying the invention into effect will now be particularly described with reference to the accompanying sheet of drawings wherein :—

Fig. 1 shows in side sectional elevation the front and rear portions of a main frame or chassis of a motor vehicle with the invention applied thereto, and Fig. 2 shows in sectional plan one side of the front and rear portions of the main frame or chassis as shown in Fig. 1.

The bumper bar proper is denoted at 1 and can be of any usual form and construction. This bumper bar 1 is carried by one arm of the two-armed lever 2 which is pivotally mounted upon a bracket 2' by means of a pivoted pin 2'' which is so disposed that the lever 2 can move around the said pin in a horizontal plane.

The bracket 2' is secured to the front of the main frame or chassis 4 by suitable straps.

To the end of that arm of the lever which is remote from the bumper bar a cable 3 is attached.

This cable 3 is extended along the length of the chassis over pulleys or rollers 5 and 6 and terminates in a connecting clamp 7 which engages with the rear spring 8 of the vehicle.

It is to be understood that the various elements described above in relation to one side of the frame or chassis, are duplicated upon the other side, so that both rear springs of the vehicle are adapted to be controlled by the movements of the bumper bar.

In action, on the exertion of an energy effect on the bumper bar 1 owing to a sudden impact or collision, the two-armed levers 2 move around their pivots 2" and transmit the energy effect to the rear springs 8 through the cables 3.

It will be observed that the energy effect thus transmitted moves in the direction opposite to the direction of the original energy effect, that is to say it moves forward, and is transmitted to the whole vehicle.

As previously stated the suddenly applied energy effects give rise to oscillations, which are eventually damped out with the result that the forces mutually balance and cancel each other so that the collision is considerably damped, and its harmful effect on the vehicle destroyed.

The destructive kinetic energy when it is liberated abruptly is thus transformed into a vibratory energy which damp out progressively and rapidly without any damage for any part of the vehicle nor for the occupants who remain stationary.

In practice, in the case of very violent shocks, the bar can undergo a deformation more or less considerable. This deformation results from the fact that it cannot be given a rigidity which is sufficient without considerable weight. It is sufficient to change said bar at a moderate price in order to restore the shock absorber to a state of operation again.

What I claim and desire to secure by Letters Patent of the United States of America is:—

1. Bumpers and collision guards, for motor vehicles having spring suspension, of the type set forth comprising a bumper bar, a two-armed lever pivoted to the chassis of the vehicle at each side thereof, one arm of each lever being connected to the bumper bar, and means connecting the other arms of the levers, which come remote from the bumper bar, to the rear springs of the vehicle, the said connecting means being such that energy effects exerted on the bumper bar are transmitted to the rear springs and to the vehicle substantially as and for the purposes set forth.

2. Bumpers and collision guards for motor vehicles as claimed in claim 1 in which the bumper bar is arranged transversely at the front of the vehicle and in which the two-armed levers rotate around their pivots in a horizontal plane, the connecting means between the arms of the levers remote from the bumper bar and the rear springs of the vehicle, being comprised by cables extending along the length of the frame of the vehicle and passing over suitable guide pulleys substantially as and for the purposes set forth.

3. Bumpers and collision guards for motor vehicles as claimed in claim 1, wherein means are incorporated in the connection between the two-armed pivoted levers and the rear springs of the vehicle for the purpose of the absorption of small shocks substantially as and for the purposes set forth.

In testimony whereof I hereunto affix my signature.

EMILE CONTI.